April 19, 1932.  C. MORTENSEN  1,854,619
MILK TREATING APPARATUS
Filed Aug. 28, 1930  2 Sheets-Sheet 1
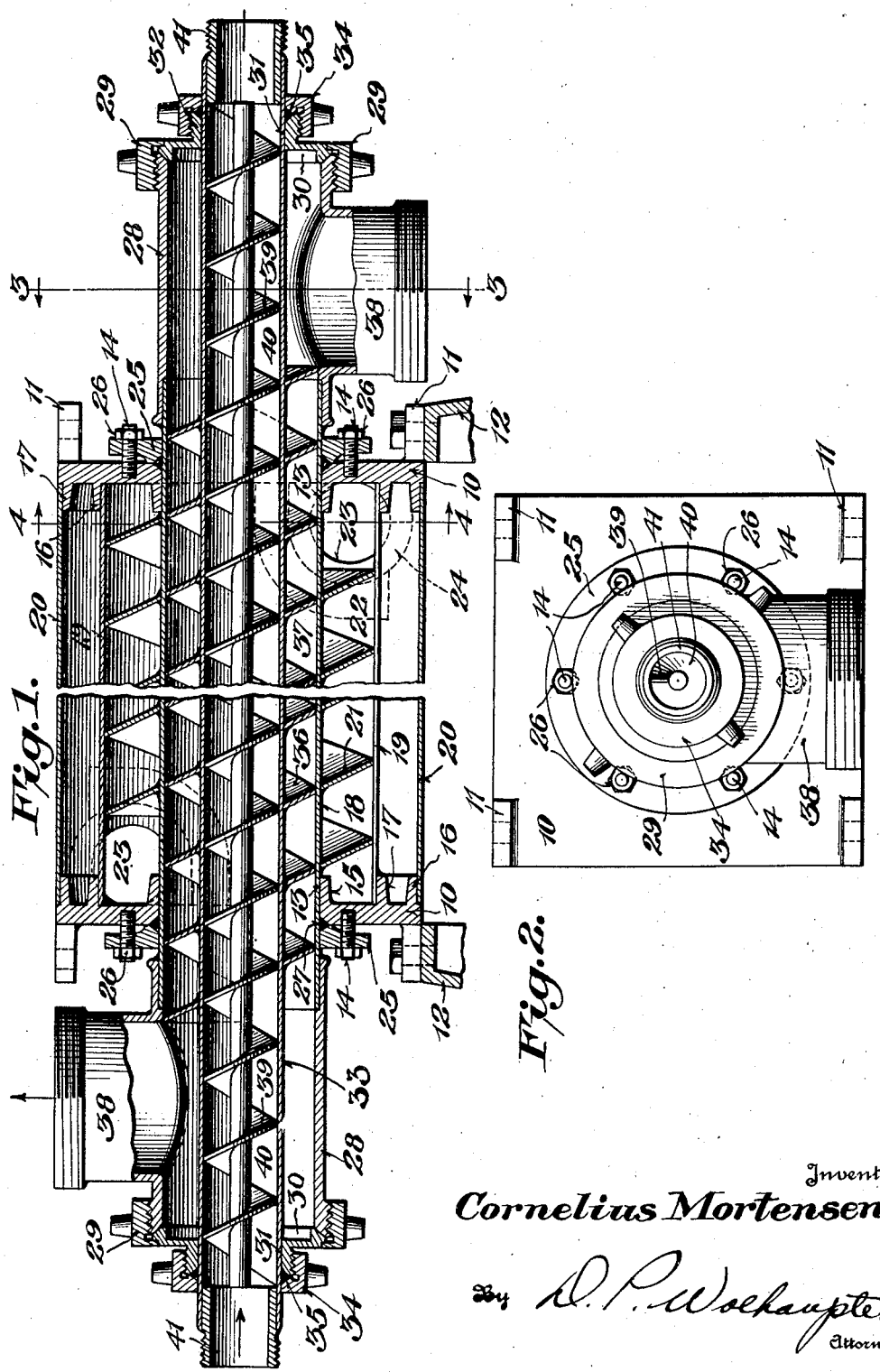
Inventor
Cornelius Mortensen,
By D. P. Wolhaupter
Attorney April 19, 1932.  C. MORTENSEN  1,854,619

MILK TREATING APPARATUS

Filed Aug. 28, 1930  2 Sheets-Sheet 2

WITNESSES:-
Chas. L. Griebauer
Carroll Bailey

Inventor
Cornelius Mortensen,
By C. P. Wolhaupter
Attorney

Patented Apr. 19, 1932

1,854,619

UNITED STATES PATENT OFFICE

CORNELIUS MORTENSEN, OF LOUISVILLE, KENTUCKY

MILK TREATING APPARATUS

Application filed August 28, 1930. Serial No. 478,516.

This invention relates to heat exchange apparatus for liquids, and has particular reference to an apparatus especially adapted for the treatment of milk, either to raise the temperature thereof by absorption of heat from a surrounding medium of higher temperature, or to lower the temperature thereof by radiation of heat to a surrounding medium of lower temperature.

The invention contemplates the provision of a structure in which separate passages for the milk or other liquids and the heating or cooling medium, hot or cold water for example, are arranged one within the other, and an important purpose of the invention is to provide a novel arrangement of this general type whereby maximum heating or cooling efficiency is obtained from the use of a minimum amount of the heating or cooling medium.

Another purpose of the invention is to provide an apparatus whereby the milk or other liquids being treated may be heated or cooled to a uniform temperature.

With the foregoing and other purposes in view, such, for example, as the provision of an apparatus which is of simple, inexpensive construction and compact in its assembly, and which may readily be disassembled for cleansing and as readily assembled for use, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a longitudinal sectional view through apparatus constructed in accordance with the invention.

Figure 2 is an end elevation of the apparatus.

Figure 3:
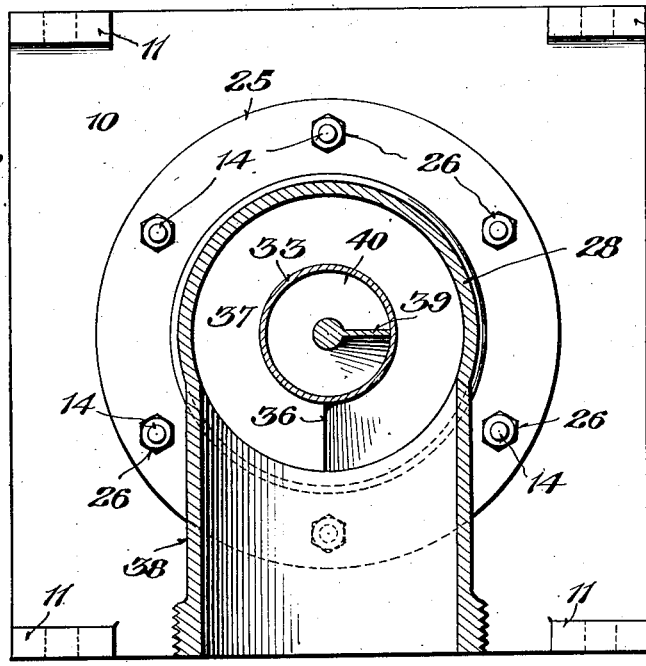
Figure 3 is a transverse section on the line 3—3 of Fig. 1.
Figure 4:
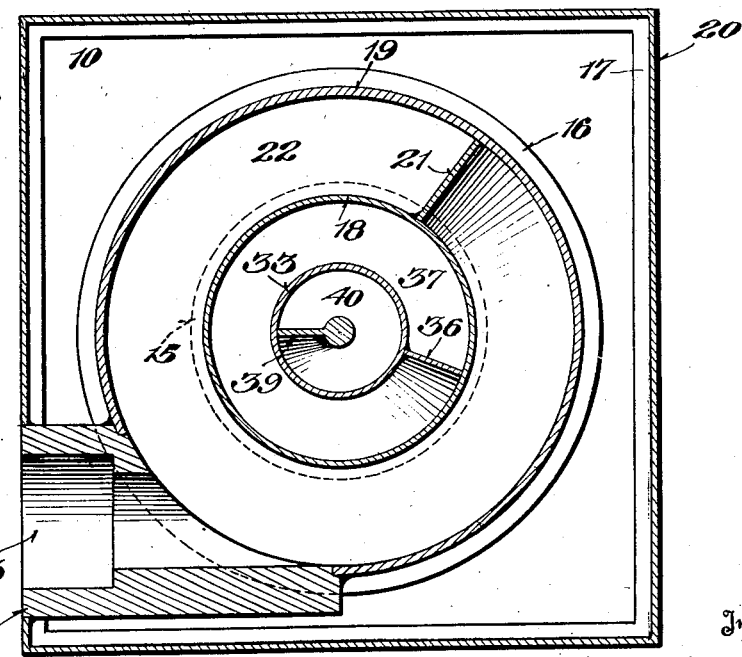
Figure 4 is a transverse section on the line 4—4 of Fig. 1.

Referring to the drawings in detail, 10, 10 designate a pair of headers in the form of metal castings in this instance of duplicate construction, each being preferably of rectangular shape and provided on its outer face with apertured lugs 11 whereby it is adapted to be bolted to a suitable support such as the stand or table illustrated at 12, and each having a central, preferably circular, opening 13 surrounded by spaced studs 14 projecting from its outer face. Projecting inwardly from the inner face of each of said headers, concentric with respect to the opening 13 and with one another, is a pair of flanges 15 and 16, the first of which, 15, directly surrounds the opening 13, and the second of which, 16, is spaced outwardly from the former. In addition, a third flange 17, which may be of any desired shape, preferably the shape of the headers, extends inwardly from each header adjacent to the margin thereof. The said headers 10, 10 are arranged in parallel, spaced relation with the openings 13 thereof in axial alinement, and extending through said openings is a tube 18 which projects a suitable distance beyond the outer face of each header.

Supported by means of the flanges 16, 16 is a tube 19 of somewhat larger diameter than the tube 18, this tube 19 surrounding the tube 18 and being welded to the flanges 16 or otherwise suitably secured to the headers 10, 10, whereby tight joints are provided to prevent escape of liquid from within said tube between the ends thereof and the headers, it being noted in this respect that the ends of the tube 19 abut the inner faces of the headers 10, 10 and thus cooperate efficiently with the tube 18 to maintain the headers rigidly connected together.

Supported by means of the flanges 17, 17 is a casing 20 disposed in surrounding, spaced relation to the tube 19 and designed to provide an insulating dead air space around said tube 19 as well as to impart a neat and attractive finish to the apparatus.

A continuous or broken spiral blade 21 is disposed within the space between the tubes 18 and 19, same contacting at its inner and outer edges with the outer and inner faces of the tubes 18, 19, respectively, whereby a continuous spiral passage 22 is provided extending from one end to the other of the space between said tubes. This blade may be formed on or attached to the outer face of the tube 18 as herein shown, or it may be formed on or attached to the inner face of the tube 19, or it may be formed as an element separate from each of said tubes and machined so as neatly to fit each of the latter, whereby, in either instance, liquid admitted to one end of the spiral passage 22 formed thereby, will be caused to traverse the full length of said passage before it may escape at the other end thereof.

Formed in the side of the tube 19, adjacent to the ends thereof, respectively, are inlet and outlet openings 23, 23 in communication with the spiral passage 22, these openings being surrounded by flanges 24 threaded or otherwise suitably formed to enable ready attachment of supply and discharge pipes therewith.

Surrounding each end portion of the tube 18 outwardly of the header 10 and provided with openings to receive the studs 14, is a packing gland 25 adapted to be drawn towards the outer face of the header 10 by nuts 26 threaded on said studs. The outer face of each header has its marginal portion surrounding the opening 13 therein beveled as indicated, and the inner face of each gland 25 likewise has its inner face beveled adjacent to the opening therein which receives the tube 18. Thus, by arranging suitable packing material 27 between the beveled faces of each header and gland, and by tightening the nuts 26, effective, liquid tight joints are provided preventing escape of liquid from the passage 22 through the openings 13 in the headers.

Welded or otherwise suitably attached to the ends of the tube 18, and forming end extensions thereof, are duplicate T-fittings 28, 28, each having detachably connected in liquid tight engagement with its outer end, as by means of a flanged collar 29 threaded thereon, a reducing bushing or adapter 30 in the form of a ring seating at its beveled inner end against the beveled outer end of the T-fitting and formed with a central opening 31, of less diameter than the T-fitting and the tube 18, surrounded by an outwardly extending externally threaded flange 32.

Extending through the tube 18 and through the openings 31 in the adapters 30, which latter it neatly fits, whereby it is supported in axial alinement with the tube 18, is a tube 33. Engaged over each end of this tube and threaded to its related adapter flange 32 is a collar 34, and between cooperating beveled faces on each flange 32 and its related collar 34 is arranged suitable packing 35 adapted to be compressed against the outside of the tube 33 by tightening of the collar 34 to provide a liquid tight joint at this point.

Disposed within the space between the tubes 18 and 33 is a continuous or broken spiral blade 36, contacting at its inner and outer edges with the outer and inner faces of the tubes 33, 18 respectively, whereby a continuous spiral passage 37, similar to the passage 22, is provided extending from the lateral opening 38 in one of the T-fittings 28 to the lateral opening in the other of said fittings. Like the blade 21, this blade 36 may be formed separately from the tubes 18, 33 and machined to snugly fit said tubes, or it may be formed either integrally with or permanently attached to either of said tubes.

Within the tube 33 is arranged a spiral blade 39 forming a spiral passage 40 which extends substantially throughout the length of said tube, this blade being formed preferably around a solid rod 41 carrying at its ends short tubular elements 41 fitting within the ends of the tube 33 whereby said blade is held accurately centered with respect to said tube. To provide a liquid tight joint at the ends of the tubes 33, same may be welded to the elements 41, and in order that the spiral passage 40 may readily be connected at its ends with feed and discharge pipes, the ends of the elements 41 preferably are threaded as shown.

In the use of the apparatus for heating or cooling milk for example, it is contemplated that milk from a suitable source of supply will be admitted through the lateral opening 38 in one of the T-fittings 28 so that it must flow through the spiral passage 37 before it may be discharged through the lateral opening in the other of said T-fittings. If desired, a pump or other means may be employed for forcing the milk through said passage, the direction of flow being immaterial. When the spiral passage 37 is employed as a conduit for the milk or other liquid to be treated, the spiral passages 22, 40 are intended to be employed as conduits for the heating or cooling water or other heating or cooling medium which is admitted to adjacent ends of said passages through one of the openings 23 and one end of the tube 33, the direction of flow of the heating or cooling medium being preferably in a direction opposite to the direction of flow of the milk. Thus, the milk is caused to travel through the apparatus in a hollow body with a heating or cooling medium disposed both inside and outside thereof and traveling in an opposite direction. In this way the milk gradually is raised or lowered in temperature as the case may be as it approaches the discharge end of the passage 22, and the heating or cooling medium likewise is gradually lowered or raised in temperature as the case may be as it approaches the discharge ends of the passages 37, 40, so that the milk as it leaves the apparatus is at substantially the same temperature as the heating or cooling medium entering the apparatus.

As is apparent, by removing the collars

29—34 and the glands 25, the parts of the apparatus may readily be disassembled for cleaning purposes and as readily reassembled.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. Apparatus of the character described comprising at least three concentric tubes of different diameter arranged in spaced relation one within the other, a spiral blade between the outer and intermediate tubes forming a spiral passage between said tubes, a spiral blade between the inner and intermediate tubes forming a spiral passage between said latter tubes, and a spiral blade within said inner tube forming a spiral passage therethrough, each of said spiral passages having an inlet opening at one end thereof and an outlet opening at the other end thereof.

2. In apparatus of the character described, a pair of spaced headers, each having an opening therein, a tube mounted at its ends in the openings in said headers, a tube disposed between said headers surrounding said first mentioned tube, a spiral blade within the space between said tubes forming a spiral passage extending between said headers, said passage having an inlet opening through said second tube near one of the headers and an outlet opening through said second tube near the other of said headers, a third tube disposed within said first tube, means providing a spiral passage between said first and third tubes having inlet and outlet openings disposed outwardly of said headers, respectively, and means providing a spiral passage through said third tube.

3. In apparatus of the character described, a pair of headers, a tube extending through said headers, packing glands surrounding the ends of said tube outwardly of said headers, respectively, means providing a spiral passage outwardly of said tube between said headers, a tube within said first tube, adapters fitting around said second tube and detachably secured fluid tight to the ends of said first tube, respectively, means providing a spiral passage between said tubes having inlet and outlet openings adjacent to said headers, respectively, and means providing a spiral passage through said second tube.

4. Apparatus of the character described comprising at least three concentric tubes of different diameter arranged in spaced relation one within the other, means between the outer and intermediate tubes forming tortuous passage between said tubes, means between the inner and intermediate tubes forming a tortuous passage between said latter tubes, and means within said inner tube forming a tortuous passage therethrough, each of said tortuous passages having an inlet opening at one end thereof and an outlet opening at the other end thereof.

In testimony whereof I hereunto affix my signature.

CORNELIUS MORTENSEN.